United States Patent [19]
Keller

[11] Patent Number: 6,039,671
[45] Date of Patent: Mar. 21, 2000

[54] MULTI-SPEED DRIVE HUB FOR A BICYCLE

[75] Inventor: Josef Keller, Schweinfurt, Germany

[73] Assignee: Kun Teng Industry Co., Ltd., Taichung, Taiwan

[21] Appl. No.: 09/247,071

[22] Filed: Feb. 9, 1999

[51] Int. Cl.[7] ...................................................... F16H 3/56
[52] U.S. Cl. ......................... 475/296; 475/298; 475/289
[58] Field of Search .................................. 475/296, 297, 475/298, 288, 289, 338, 339, 340; 192/217.4; 280/236, 237, 238

[56] References Cited

U.S. PATENT DOCUMENTS

| | | | |
|---|---|---|---|
| 2,301,852 | 11/1942 | Brown ...................................... | 475/289 |
| 2,687,050 | 8/1954 | Brown .................................. | 475/296 X |
| 3,973,451 | 8/1976 | Kine ........................................ | 475/297 |
| 4,721,013 | 1/1988 | Steuer et al. ............................. | 475/289 |
| 5,078,664 | 1/1992 | Nagano ................................. | 475/296 X |
| 5,445,573 | 8/1995 | Nurnberger .............................. | 475/298 |
| 5,813,937 | 9/1998 | Rickels ................................. | 475/298 X |
| 5,855,530 | 1/1999 | Huang et al. ........................ | 475/288 X |

*Primary Examiner*—Scott Lund
*Attorney, Agent, or Firm*—Sughrue, Mion, Zinn, Macpeak & Seas, PLLC

[57] ABSTRACT

A multi-speed drive hub for bicycles includes a hub axle, an epicyclical gear unit, a drive-side coupling gear, an output-side coupling gear, first and second tooth systems, and a spring-loaded shift link. The epicyclical gear unit is mounted concentrically on the hub axle and has a ring gear, a planet-gear carrier, a plurality of double planet gears mounted rotatably on the planet-gear carrier, and two sun gears meshing with the double planet gears. The ring gear meshes with the double planet gears. The first tooth system connects the drive-side coupling gear to one of the ring gear and the planet-gear carrier. The second tooth system connects the output-side coupling gear to one of the planet-gear carrier and the ring gear. The shift link is mounted coaxially on and slidable axially of the hub axle, and has a plurality of axially spaced radial lugs provided thereon. The drive-side and output-side coupling gears are connected to the shift link to be displaced therewith along the hub axle. The radial lugs engage selectively the sun gears when the shift link is displaced along the hub axle.

10 Claims, 7 Drawing Sheets

MULTI-SPEED DRIVE HUB FOR A BICYCLE

BACKGROUND OF THE INVENTION

1. Field of the Invention

This invention relates to a multi-speed drive hub for a bicycle, more particularly to a five-speed drive hub for a bicycle.

2. Description of the Related Art

Known five-speed drive hubs generally work with a two-stage epicyclical gear unit. It is known that this type of gear unit permits the reciprocal reversal of transmission ratios, such as drive ring gear/output planet-gear carrier for the speed reduction and drive planet-gear carrier/output ring gear for reciprocal speed increase, with a fixed sun gear in each case. The direct transmission via ring gear or planet-gear carrier results in a transmission ratio of 1:1, and completes the five-stage gear transmission.

To shift such drive hubs, a gear cable is provided, for example, at each end of the hub axle, which gear cable control pawls that displace the drive-side or the output-side coupling gear. The shift control with two gear cables is quite complicated, since the two gear cables have to be united in a shift control fastened to the handlebars of the bicycle.

Also known are two shift controls which are integrated in the hub and which are led outwards on one side via an axle bore so as to be united by a device, that is flange-mounted on the hub axle, to form a one-piece gear-cable control.

In view of this problem, a multi-speed drive hub, in particular a five-speed drive hub, is to be developed in such a way that the shift device is simplified and that shifting with only a single gear cable is possible.

SUMMARY OF THE INVENTION

The object of the present invention is to provide a multi-speed drive hub that has a simple shift device which is capable of being shifted by a single gear cable.

According to the present invention, a multi-speed drive hub for bicycles comprises a hub axle, an epicyclical gear unit, a drive-side coupling gear, an output-side coupling gear connected to a hub sleeve, first and second tooth means, and a spring-loaded shift link with opposite first and second ends.

The epicyclical gear unit is mounted concentrically on the hub axle, and has a ring gear, a planet-gear carrier, a plurality of double planet gears mounted rotatably on the planet-gear carrier, and two sun gears meshing with the double planet gears. The ring gear meshes with the double planet gears. The first tooth means is adapted for connecting the drive-side coupling gear to one of the ring gear and the planet-gear carrier. The second tooth means is adapted for connecting the output-side coupling gear to one of the planet-gear carrier and the ring gear. The shift link is mounted coaxially on and slidable axially of the hub axle, and has a plurality of axially spaced radial lugs provided thereon. The drive-side coupling gear and the output-side coupling gear are connected to the shift link to be displaced therewith along the hub axle. The radial lugs engage selectively the sun gears when the shift link is displaced along the hub axle.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
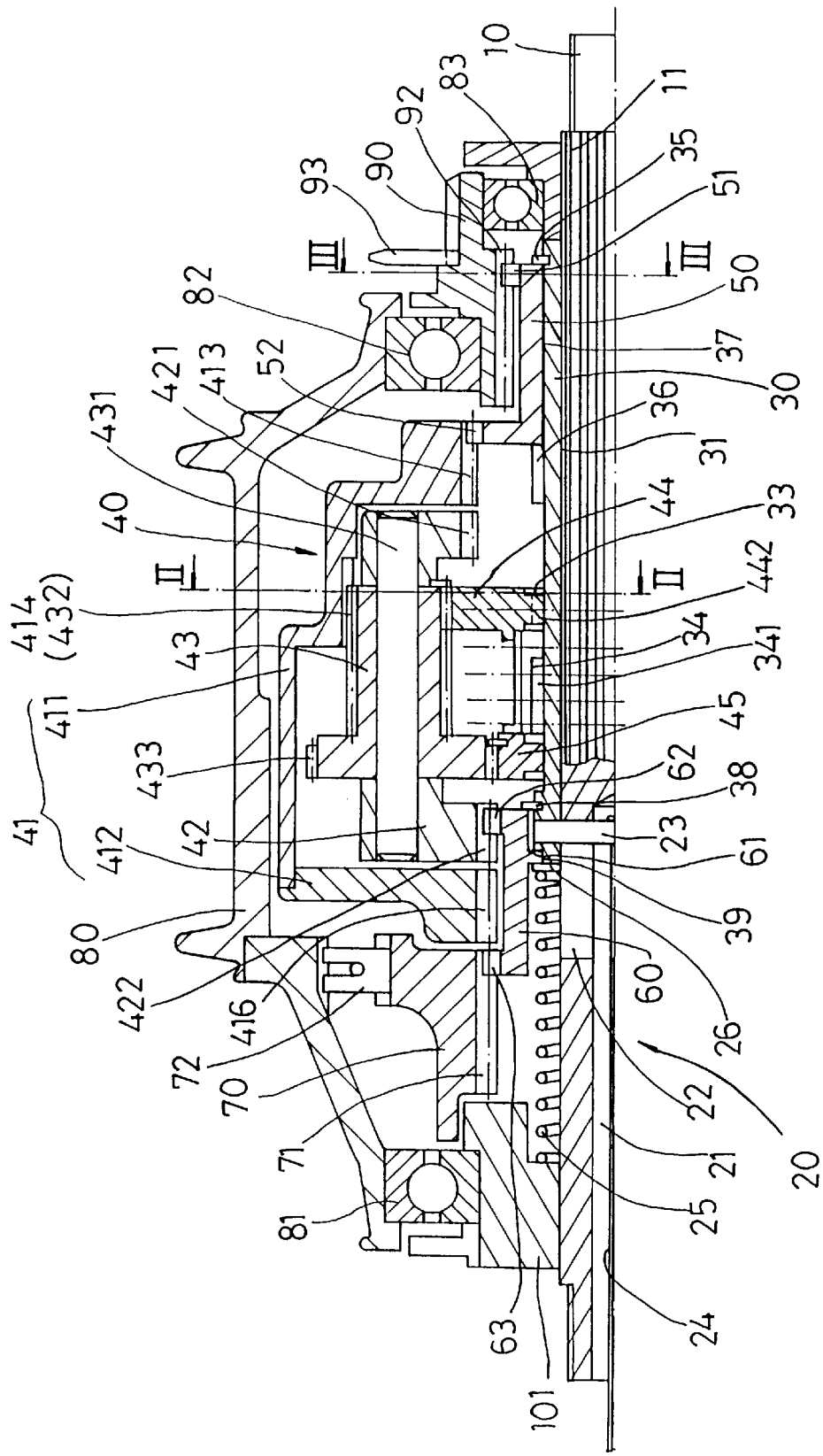
FIG. 1 shows the top half section of a preferred embodiment of a five-speed drive hub according to the present invention with an engaged first gear.

Referring to FIG. 1, a preferred embodiment of a five-speed drive hub according to the present invention is shown to comprise a hub axle 10, a gear cable assembly 20, a shift link 30, an epicyclical gear unit 40, a drive side coupling gear 50, an output-side coupling gear 60, a pawl carrier 70, a hub sleeve 80 and a driver 90.

The hub axle 10 is a spline shaft with axially extending projections 11.

The gear cable assembly 20 includes an axial bore 21 formed in the hub axle 10, a thrust block 23 disposed in a slot 22 that extends through the hub axle 10, and a gear cable 24 connected to the thrust block 23 for actuating the multi-speed drive hub. A compression spring 25 and a washer 26 are sleeved on the hub axle 10 between one end of the shift link 30 to which the thrust block 23 is connected and a support member 101.

Figure 3:
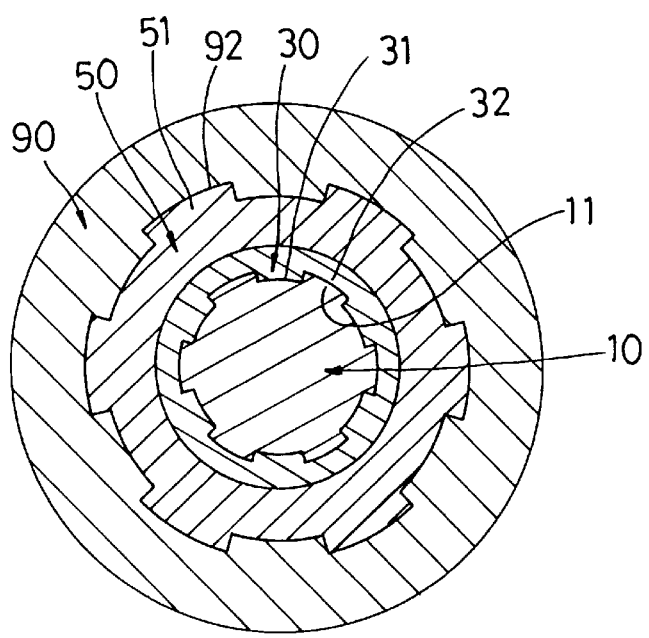
FIG. 3 is a cross sectional view taken along line III—III of FIG. 1.
Figure 4:
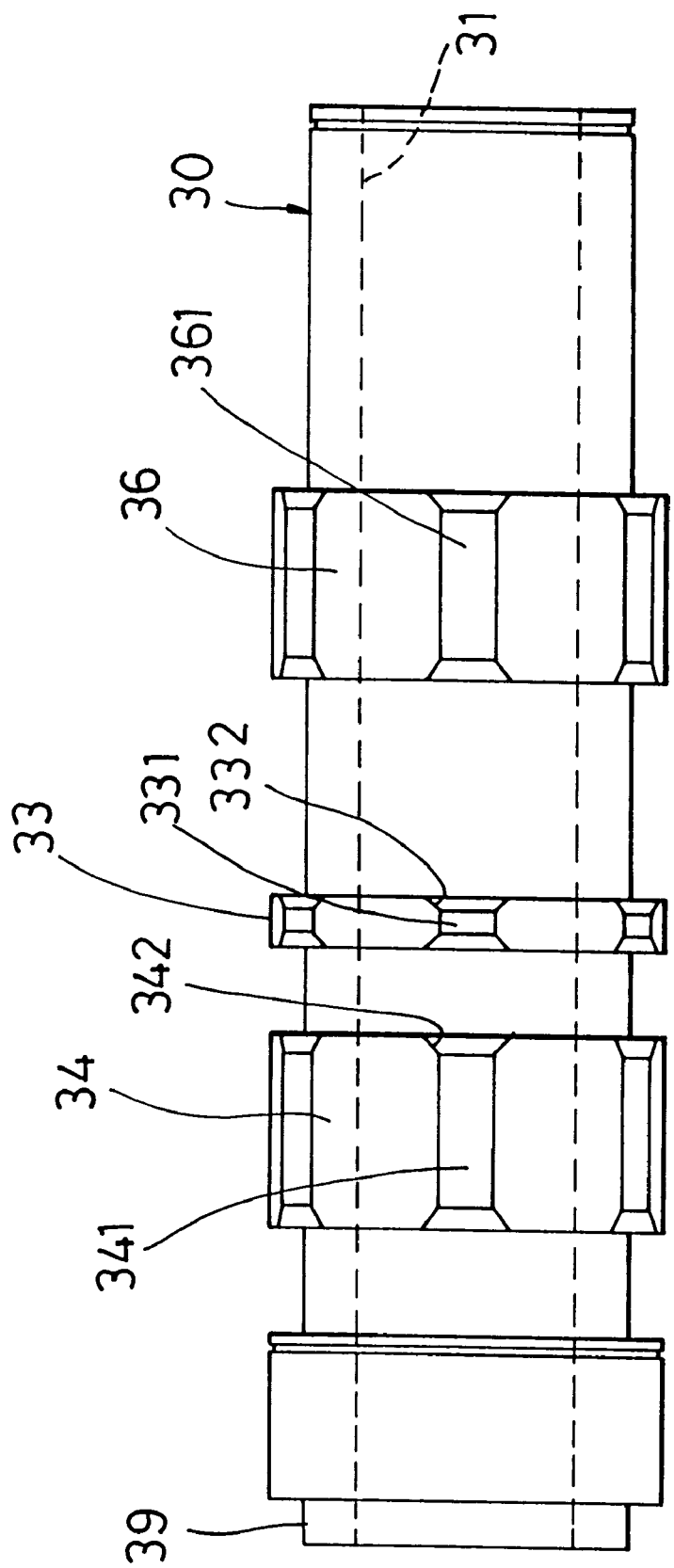
FIG. 4 is planar view of a shift link of the five-speed drive hub according to the present invention.

Referring to FIGS. 3 and 4, the shift link 30 is tubular and has an axial hole 31 and a plurality of axially running guide grooves 32 formed in an inner face of the shift link 30. The guide grooves 32 engage the projections 11 on the hub axle 10 so that the shift link 30 is coupled to the hub axle 10 in a rotationally locked but axially displaceable manner. The shift link 30 has axially spaced first, second and third radial lugs 33, 34, 36 that are formed respectively with axial grooves 331, 341, 361. Each of the axial grooves 331, 341, 361 has two inwardly tapered guide faces 332, 342, 362 formed at two end portions thereof. The shift link 30 further has a limiting groove 37 that is formed between a snap ring 35 and the third radial lug 36 at a first end of the shift link 30, and a retention ring 38 and a step portion 39 provided at a second end of the shift link 30. The washer 26 abuts against the second end of the shift link 30 outwardly of the step portion 39 by virtue of the spring force of the compression spring 25.

Referring back to FIG. 1, the epicyclical gear unit 40 is mounted concentrically on the hub axle 10, and has a two-piece ring gear 41, a planet-gear carrier 42, a plurality of double planet gears 43 (only one is shown in the drawing), and first and second sun gears 44, 45. The ring gear 41 has a hollow housing that consists of first and second ring gears 411, 412. The ring gear 41 encloses the double planet gears 43 in the axial direction of the hub axle 10. The first ring gear 411 has drive-side coupling teeth 413 formed at one side thereof, and gear 414 formed on an inner face thereof. The second ring gear 412 is provided with output-side coupling teeth 416. The planet carrier 42 is formed as a hollow cylinder having first and second coupling teeth 421, 422 at two opposed ends thereof. The first coupling teeth 421 are located inside the drive-side coupling teeth 413, while the second coupling teeth 422 are located inside the output-side coupling teeth 416. Each of the double planet gears 43 is mounted rotatably on a bearing pin 431, and has a smaller gear portion 432 and a larger gear portion 433. The smaller gear portion 432 engages the gear 414.

Figure 2:
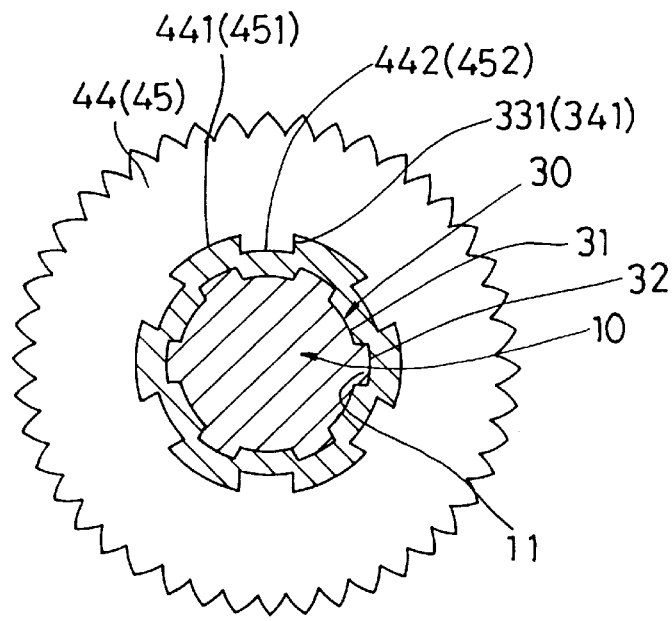
FIG. 2 is a cross sectional view taken along line II—II of FIG. 1.

Referring to FIG. 2, the first and second sun gears 44, 45 engage respectively the smaller and larger gear portions 432, 433 of the double planet gears 43. Each of the first and second sun gears 44, 45 has a central hole 441, 451 with an inner profile 442, 452 that complements the outer profile 331, 341, 361 of each of the radial lugs 33, 34, 36.

Referring again to FIG. 1, the drive-side coupling gear 50 is disposed rotatably in the limiting groove 37 of the shift link 30, and is prevented from axial movement relative to the shift link 30 by means of the snap ring 35 and the third radial lug 36. The drive-side coupling gear 50 has first coupling teeth 51 and second coupling teeth 52 provided respectively at two opposed ends thereof. The second teeth 52 are adapted to be connected to either one of the drive-side coupling teeth 413 and the first coupling teeth 421.

The output-side coupling gear 60 is retained rotatably in the step portion 39 of the shift link 30, and has an inner radial flange 61. The radial flange 61 and one end of the output-side coupling gear 60 are located between and abut respectively against the washer 26 and the retention ring 38. The outer surface of the output-side coupling gear 60 has first coupling teeth 62 and second coupling teeth 63 provided respectively at two opposed ends of the coupling gear 60. The first coupling teeth 62 are adapted to be connected to either one of the second coupling teeth 422 and the output-side coupling teeth 416. Therefore, via the output-side coupling gear 60, the planet-gear carrier 42 or the second ring gear 412 can be connected to the pawl carrier 70 for the transmission of torque.

The pawl carrier 70 is mounted rotatably on the hub axle 10 adjacent to the second ring gear 412 of the epicyclical unit 40. The pawl carrier 70 has coupling teeth 71 that engage the second coupling teeth 63 of the output-side coupling gear 60, and a pawl freewheel 72 that engages the hub sleeve 80.

The hub sleeve 80 is supported on the hub axle 10 via rolling-contact bearings 81, 82 83. The driver 90 is mounted coaxially on the hub axle 10, and is provided with inner driver teeth 92 that engage the first coupling teeth 51 of the drive-side coupling gear 50. Therefore, the driver 90 can be connected to the first ring gear 411 or the planet-gear carrier 42 via the drive-side coupling gear 50.

The mode of operation of the multi-speed drive hub of the present invention is to be explained hereinbelow with reference to FIG. 1 and FIGS. 5 to 8. FIG. 1 shows the position with an engaged first gear, that is, with a speed reduction. The driver 90 is connected to the ring gear 41 via the drive-side coupling gear 50 that is mounted rotatably on the shift link 30, and to the pawl carrier 70 via the planet-gear carrier 42 and the output-side coupling gear 60 mounted rotatably on the shift link 30. The first radial lug 33 engages the first sun gear 44. In this way, the driving force can be transmitted from the driver 90 to the hub sleeve 80.

Figure 5:
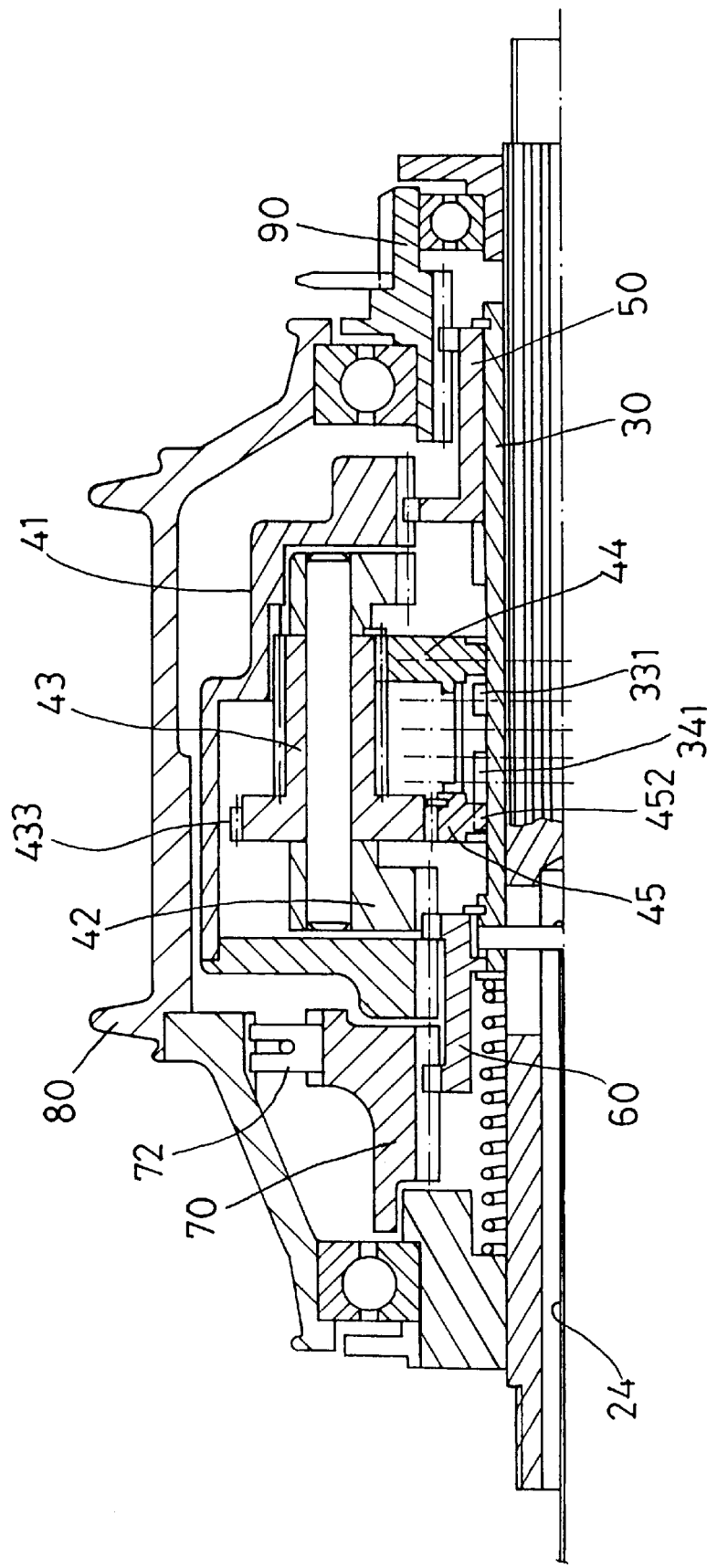
FIG. 5 shows the top half section of the five-speed drive hub with an engaged second gear.

If the shift link 30 is now moved further by one step (to the left in the drawing), the second gear with a speed reduction is engaged. As shown in FIG. 5, the driver 90 is now connected to the ring gear 41 via the drive-side coupling gear 50, and to the pawl carrier 70 via the planet-gear carrier 42 and the output-side coupling gear 60. The first radial lug 33 is disengaged from the first sun gear 44, and the second radial lug 34 engages the second sun gear 45.

Figure 6:
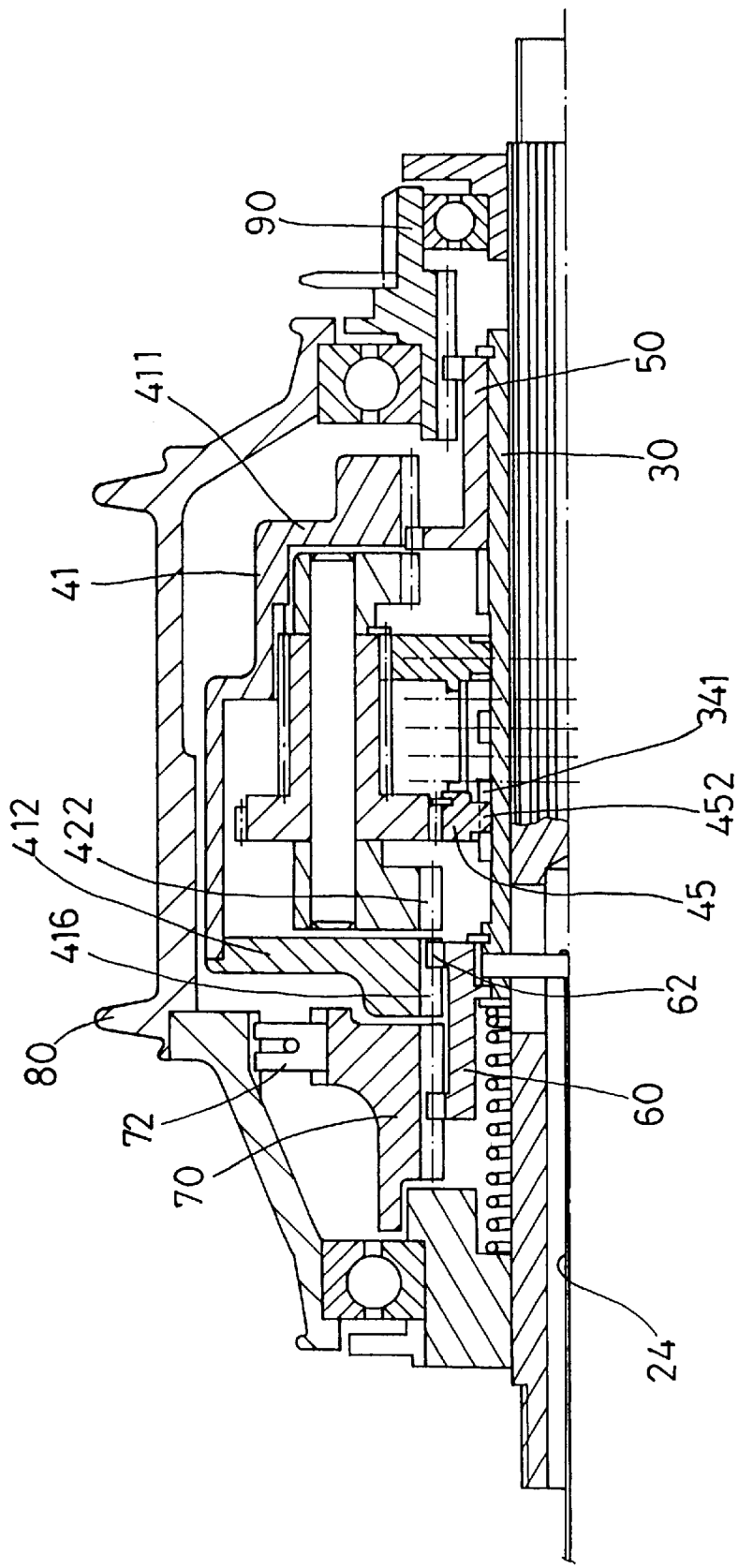
FIG. 6 shows the top half section of the five-speed drive hub with an engaged third gear.

FIG. 6 shows the engaged third gear, which offers a direct transmission. The diver 90 is still connected to the first ring gear 411 of the ring gear 41 via the drive-side coupling gear 50. On the output side, the output-side coupling gear 60 now engages the second ring gear 412 of the ring gear 41, and connects the latter to the pawl carrier 70, which is connected to the hub sleeve 80 via the pawl freewheel 72.

Figure 7:
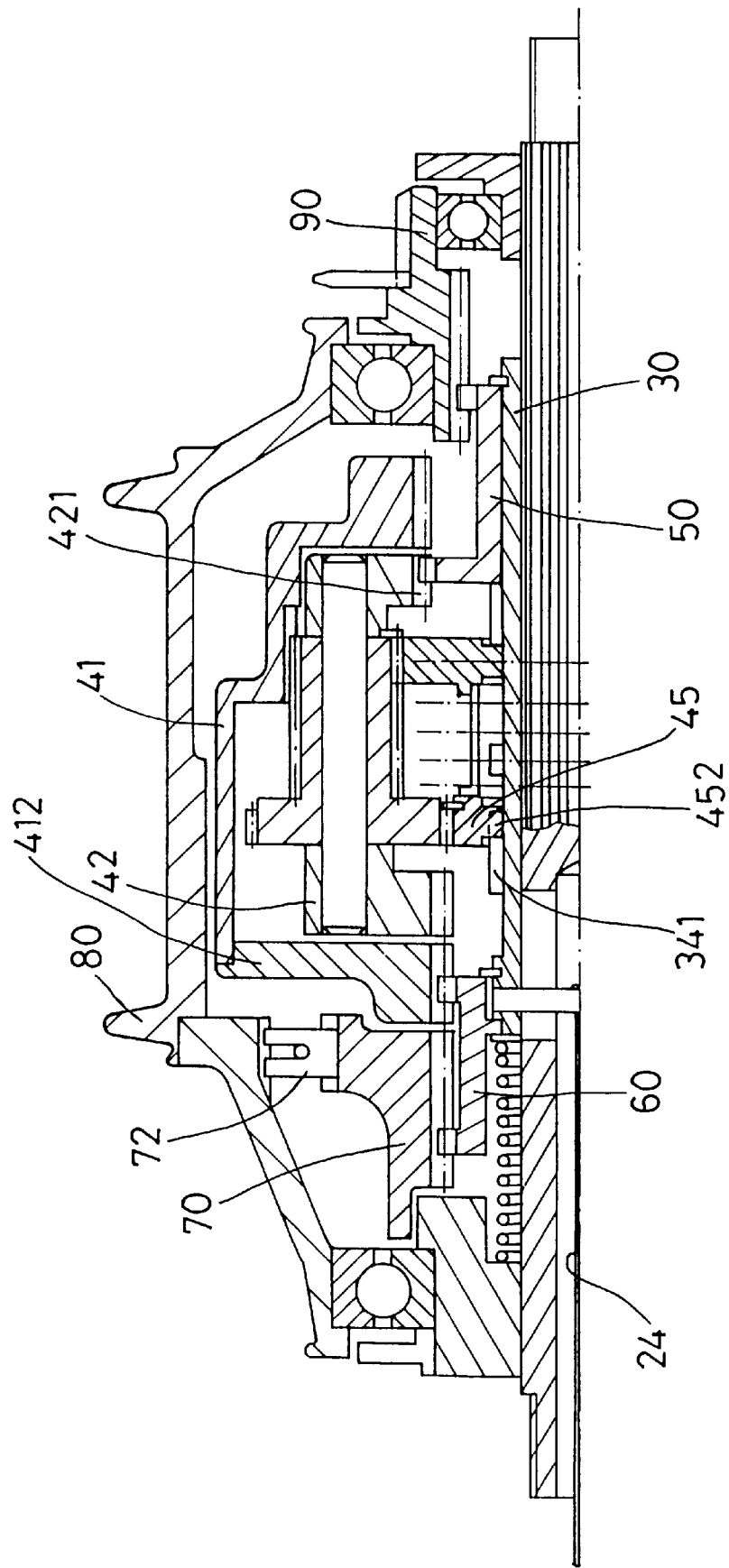
FIG. 7 shows the top half section of the five-speed drive hub with an engaged fourth gear.

FIG. 7 shows the first speed increase (fourth gear). The drive-side coupling gear 50 connects the driver 90 to the planet-gear carrier 42, and the output-side coupling gear 60 connects the second ring gear 412 to the pawl carrier 70. The second sun gear 45 engages the second radial lug 34.

Figure 8:
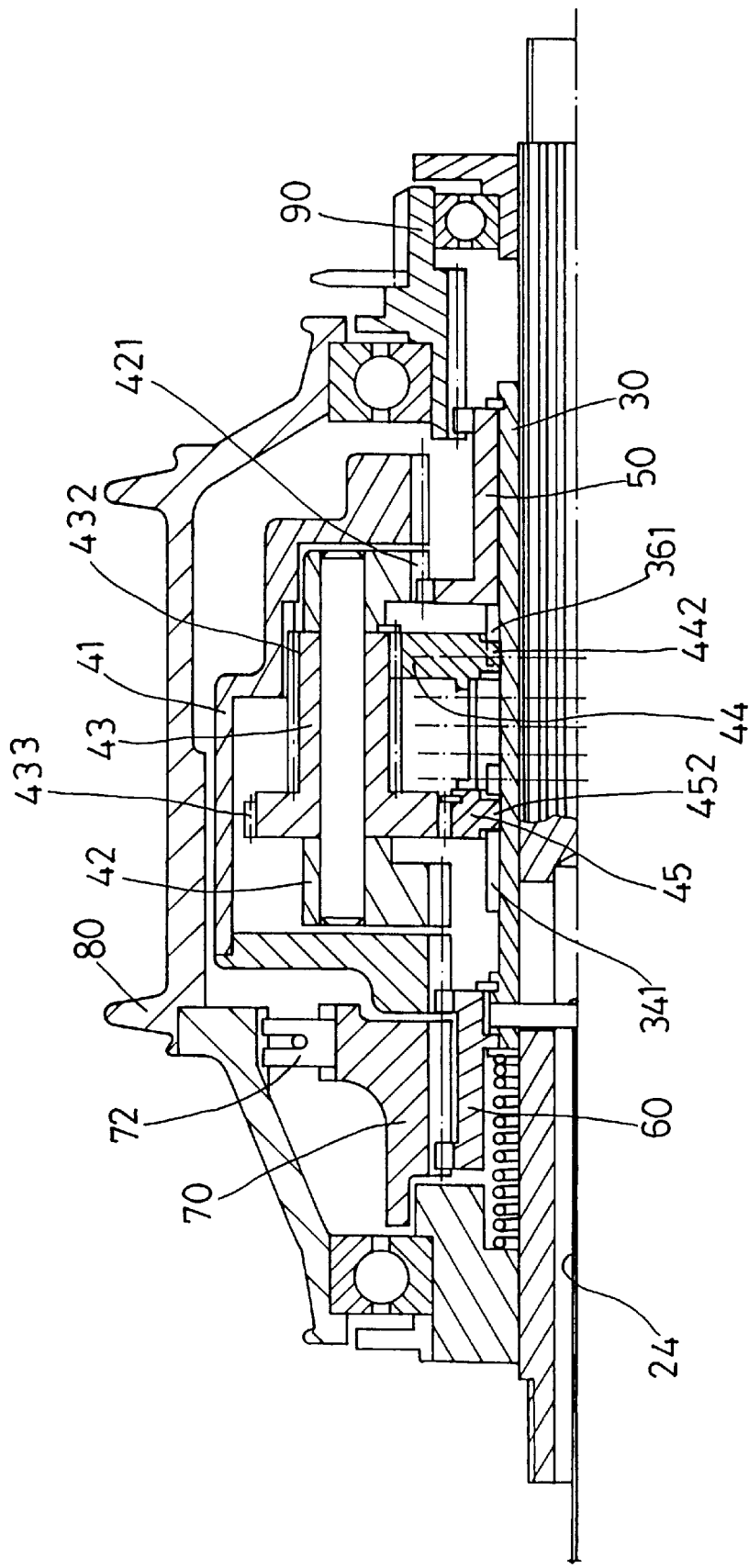
FIG. 8 shows the top half section of the five-speed drive hub with an engaged fifth gear.

FIG. 8 shows the last transmission stage. The drive-side coupling gear 50 connects the driver 90 to the planet-gear carrier 42, and the output-side coupling gear 60 connects the second ring gear 412 to the pawl carrier 70. The first sun gear 44, which meshes with the smaller gear portions 432 of the double planet gears 43, engages the third radial lug 36. Therefore, the planet-gear carrier 42 can be rotated due to the connection of the planet-gear carrier 42 and the gear portions 432 of the double planet gears 43.

It is noted that the first to fifth gears can be engaged one after the other by displacing the shift link 30. The shift link 30 is of a sleeve-shaped design and is inexpensive to produce. Due to the simplified construction, the drive hub of the present invention requires considerably fewer individual parts as compared to conventional drive hubs, so that assembly can be carried out quicker and more cost-effectively. Due to the use of only one gear cable, conventional, inexpensive shift controls for the handgrip, such as a knob lever, can be used.

In addition, since the shift link 30 is connected to the drive-side coupling gear 50 at one end thereof and to the output-side coupling gear 60 at other end thereof, the direction of force lines is ensured. Because the coupling gears 50, 60 are mounted rotatably and directly on the shift link 30, the components are further simplified. Further, the guide faces 332, 342, 362 of the axial grooves 331, 341, 361 facilitate the engagement of the radial lugs 33, 34, 36 and the sun gears 44, 45, thereby facilitating the shifting of the individual gears.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A multi-speed drive hub for bicycles, comprising:

a hub axle;

a hub sleeve mounted coaxially and rotatably on said hub axle;

an epicyclical gear unit mounted concentrically on said hub axle and having a ring gear, a planet-gear carrier, a plurality of double planet gears mounted rotatably on said planet-gear carrier, and two sun gears meshing with said double planet gears, said ring gear meshing with said double planet gears;

a drive-side coupling gear;

an output-side coupling gear connected to said hub sleeve;

first tooth means for connecting said drive-side coupling gear to one of said ring gear and said planet-gear carrier;

second tooth means for connecting said output-side coupling gear to one of said planet-gear carrier and said ring gear; and a spring-loaded shift link mounted coaxially on and slidable axially of said hub axle and having a plurality of axially spaced radial lugs provided thereon, said drive-side coupling gear and said output-side coupling gear being connected to said shift link to be displaced therewith along said hub axle, said radial lugs engaging selectively said sun gears when said shift link is displaced along said hub axle.

2. The multi-speed drive hub as claimed in claim 1, wherein three of said radial lugs are provided on said shift link at three axially spaced apart positions.

3. The multi-speed drive hub as claimed in claim 1, wherein said shift link has a first end to which said drive-side coupling gear is connected, and a second end to which said output-side coupling gear is connected.

4. The multi-speed drive hub as claimed in claim 3, wherein said drive-side and output-side coupling gears are mounted rotatably on said shift link.

5. The multi-speed drive hub as claimed in claim 1, wherein said shift link is connected to said hub axle in such a manner that said shift link is rotationally locked but displaceable axially relative to said hub axle.

6. The multi-speed drive hub as claimed in claim 5, wherein said shift link has a tubular wall and axially extending guide grooves formed in an inner surface of said tubular wall, said hub axle having axially extending projections that engage correspondingly said guide grooves of said shift link.

7. The multi-speed drive hub as claimed in claim 1, wherein each of said sun gears has a central hole, and an inner profile defining said central hole, each of said radial lugs having an outer profile that complements said inner profile of each of said sun gears.

8. The multi-speed drive hub as claimed in claim 1, further comprising a thrust block connected to said shift link, and a gear cable connected to said thrust block.

9. The multi-speed drive hub as claimed in claim 1, further comprising a support member fixed to said hub axle distal from an end of said shift link, and a compression spring disposed between said end of said shift link and said support member.

10. The multi-speed drive hub as claimed in claim 1, wherein said ring gear encloses said double planet gears in an axial direction of said hub axle.

\* \* \* \* \*